United States Patent
Stumpf et al.

(10) Patent No.: US 10,031,571 B2
(45) Date of Patent: Jul. 24, 2018

(54) SYSTEMS AND METHODS FOR POWER LOSS PROTECTION OF STORAGE RESOURCES

(71) Applicant: Dell Products L.P., Round Rock, TX (US)

(72) Inventors: Michael J. Stumpf, Cedar Park, TX (US); Timothy M. Lambert, Austin, TX (US); Frank Widjaja Yu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 15/203,481

(22) Filed: Jul. 6, 2016

(65) Prior Publication Data
US 2018/0011524 A1    Jan. 11, 2018

(51) Int. Cl.
G06F 11/00    (2006.01)
G06F 1/30    (2006.01)
G06F 11/07    (2006.01)
G06F 11/20    (2006.01)

(52) U.S. Cl.
CPC .............. *G06F 1/30* (2013.01); *G06F 11/079* (2013.01); *G06F 11/0727* (2013.01); *G06F 11/0751* (2013.01); *G06F 11/0772* (2013.01); *G06F 11/0793* (2013.01); *G06F 11/2015* (2013.01)

(58) Field of Classification Search
CPC . G06F 11/2015; G06F 11/0727; G06F 11/751
See application file for complete search history.

(56) References Cited

U.S. PATENT DOCUMENTS

| | | | | |
|---|---|---|---|---|
| 5,799,200 A * | 8/1998 | Brant | ................... | G06F 11/1441 365/229 |
| 2010/0169031 A1* | 7/2010 | Dishman | ................ | G01R 31/40 702/60 |
| 2012/0089855 A1* | 4/2012 | Beckhoff | ................... | G06F 1/30 713/340 |
| 2012/0137289 A1* | 5/2012 | Nolterieke | .......... | G06F 9/45558 718/1 |
| 2014/0310539 A1* | 10/2014 | Messick | ................. | G06F 1/263 713/320 |

* cited by examiner

*Primary Examiner* — Charles Ehne
(74) *Attorney, Agent, or Firm* — Jackson Walker L.L.P.

(57) ABSTRACT

In accordance with embodiments of the present disclosure, a method for power loss protection of one or more storage resources may include receiving information from each of the one or more storage resources regarding power loss protection capabilities of such storage resource. The method may also include based on the information, repurposing, for each power loss protection capable storage resource, a communications channel between a logic device and such power loss protection capable storage resource for transmission of a respective early power-off warning signal for such power loss protection capable storage resource. The method may further include in response to a power event of a power supply unit for providing electrical energy to the one or more storage resources, asserting for each power loss protection capable storage resource its respective early power-off warning signal.

12 Claims, 2 Drawing Sheets

SYSTEMS AND METHODS FOR POWER LOSS PROTECTION OF STORAGE RESOURCES

TECHNICAL FIELD

The present disclosure relates in general to information handling systems, and more particularly to systems and methods for providing for power loss protection in storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ storage resources for storing data. A storage resource may include non-volatile storage that may retain data even when electrical power is removed either from an unexpected power loss, brownout, system crash, or from a normal system shutdown, but may also include volatile memory (e.g., dynamic random access memory (DRAM)) as a cache to store frequently-used or accessed data. To ensure data integrity, it may be desirable for such storage resources to have power loss protection, in order that in the event of a power fault, cached data is flushed to the non-volatile storage before power is completely withdrawn. Power loss protection may also be useful is preventing destruction of old data in many newer types of storage resources.

SUMMARY

In accordance with the teachings of the present disclosure, the disadvantages and problems associated with existing approaches to power loss protection may be reduced or eliminated.

In accordance with embodiments of the present disclosure, a method for power loss protection of one or more storage resources may include receiving information from each of the one or more storage resources regarding power loss protection capabilities of such storage resource. The method may also include based on the information, repurposing, for each power loss protection capable storage resource, a communications channel between a logic device and such power loss protection capable storage resource for transmission of a respective early power-off warning signal for such power loss protection capable storage resource. The method may further include in response to a power event of a power supply unit for providing electrical energy to the one or more storage resources, asserting for each power loss protection capable storage resource its respective early power-off warning signal.

In accordance with these and other embodiments of the present disclosure, an information handling system may include one or more storage resources, a power supply unit for supplying electrical energy to the one or more storage resources, and circuitry coupled to the power supply unit and the one or more storage resources. The circuitry may be configured to receive information from each of the one or more storage resources regarding power loss protection capabilities of such storage resource. The circuitry may also be configured to based on the information, repurpose, for each power loss protection capable storage resource, a communications channel between a logic device and such power loss protection capable storage resource for transmission of a respective early power-off warning signal for such power loss protection capable storage resource. The circuitry may be further configured to in response to a power event of the power supply unit for providing electrical energy to the one or more storage resources, assert for each power loss protection capable storage resource its respective early power-off warning signal.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to: (i) receive information from each of one or more or more storage resources regarding power loss protection capabilities of such storage resource; (ii) based on the information, repurpose, for each power loss protection capable storage resource, a communications channel between a logic device and such power loss protection capable storage resource for transmission of a respective early power-off warning signal for such power loss protection capable storage resource; and (iii) in response to a power event of a power supply unit for providing electrical energy to the one or more storage resources, assert for each power loss protection capable storage resource its respective early power-off warning signal.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
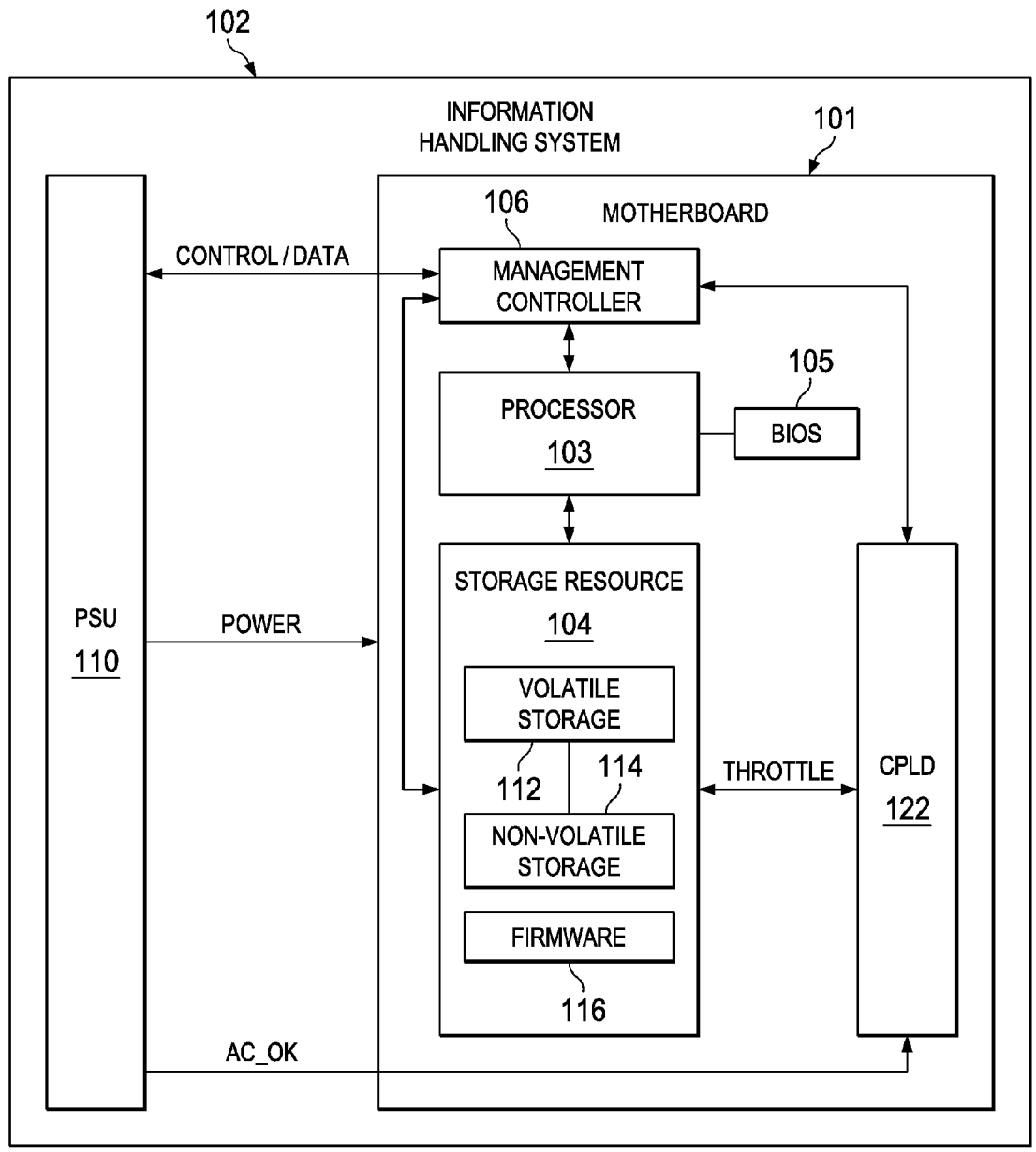
FIG. 1 illustrates a block diagram of an example information handling system, in accordance with embodiments of the present disclosure.
Figure 2:
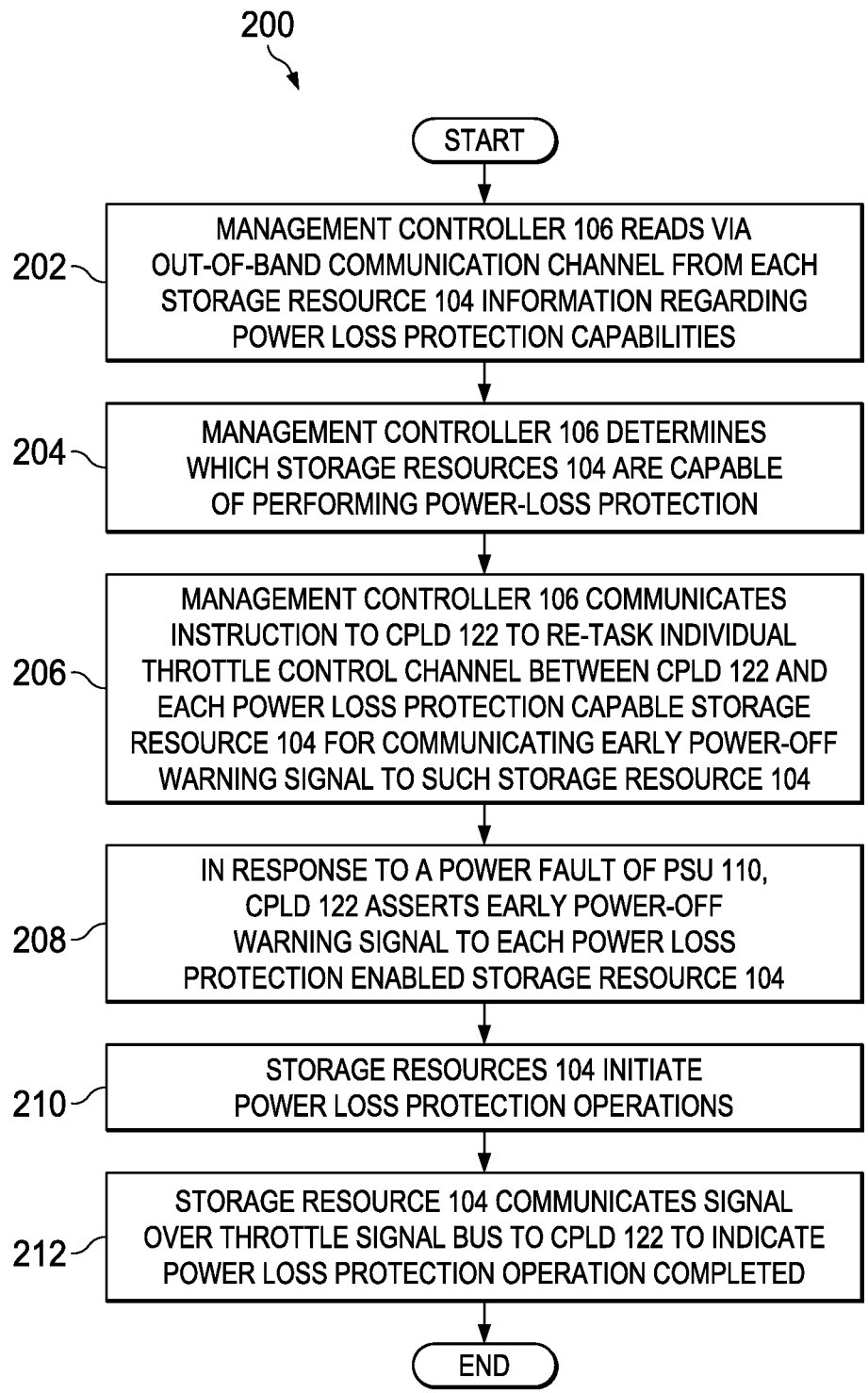
FIG. 2 illustrates a flow chart of an example method for power loss protection of storage resources, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, storage resource 104, a BIOS 105, a management controller 106, and a complex programmable logic device 122, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in storage resource 104 and/or another component of information handling system 102.

Storage resource 104 may be communicatively coupled to processor 103 and may include any system, device, or apparatus configured to store data. Storage resource 104 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 104 may include one or more storage enclosures configured to hold and/or power one or more of such devices. In the embodiments represented by FIG. 1, storage resource 104 may reside within information handling system 102. However, in other embodiments, storage resource 104 may reside external to information handling system 102 (e.g., may be coupled to information handling system 102 via a network or other wired connection).

As shown in FIG. 1, storage resource 104 may comprise a volatile storage 112 (e.g., DRAM or other volatile random-access memory) which may be used as a cache and non-volatile storage 114 (e.g., flash memory, magnetic storage, or other non-volatile storage). During normal operation, when PSU 110 provides adequate power to components of information handling system 102, data written to storage resource 104 from processor 103 may be stored in volatile storage 112 as cache data. However, in the event of an input power loss or power fault of PSU 110 that prevents delivery of electrical energy from PSU 110 to storage resource 104, storage resource 104 may, as described in greater detail below, receive a control signal from CPLD 122 indicating that such a power event has occurred, and firmware 116 of storage resource 104 may respond to such control signal by transferring cached data from volatile storage 112 to non-volatile storage 114 in a cache flush operation. In addition, because in certain storage technologies, nonvolatile storage write operations must not be interrupted in order to prevent data corruption, firmware 116 of storage resource 104 may respond to such control signal by ensuring that such in-flight operations are completed before full power loss.

Firmware 116 may include any system, device, or apparatus configured to carry out the functionality of storage resource 104, including logic needed to perform cache flush operations, as described in greater detail elsewhere in this disclosure. In some embodiments, firmware 116 may be implemented as a program of instructions that may be read by and executed on a controller within storage resource 104 (not explicitly shown) to carry out the functionality of storage resource 104.

BIOS 105 may include any system, device, or apparatus configured to identify, test, and/or initialize information handling resources of information handling system 102, and/or initialize interoperation of information handling system 102 with other information handling systems. "BIOS"

may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Management controller 106 may be communicatively coupled to processor 103, PSU 110, and/or storage resource 104, and configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110.

CPLD 122 may be coupled to management controller 106, storage resource 104, PSU 110, and/or other components of information handling system 102. In some embodiments, CPLD 122 may be configured to perform functionality relating to power loss protection of storage resource 104, as described elsewhere herein. In these and other embodiments, CPLD 122 may include other functionality relating to the operation and/or functionality of information handling system 102.

Generally speaking, PSU 110 may include any system, device, or apparatus configured to supply electrical current to one or more information handling resources of information handling system 102. As shown in FIG. 1, in the event of a power fault of PSU 110, PSU 110 may de-assert a signal (labeled AC_OK in FIG. 1) indicating such power fault (e.g., a loss by PSU 110 of its alternating current input).

In addition to motherboard 101, processor 103, storage resource 104, BIOS 105, management controller 106, CPLD 122, and PSU 110, information handling system 102 may include one or more other information handling resources. For example, in some embodiments, information handling system 102 may include more than one PSU 110 and/or more than one storage resource 104.

In operation, management controller 106 and CPLD 122 may be configured to discover hardware inventory of information handling system 102 and based thereon, assign alternate uses to a signal channel (shown in FIG. 1 as "THROTTLE") otherwise used for throttling devices (e.g., a Peripheral Component Interconnect Express (PCIe) PWR-BRAKE signal) including for communication from CPLD 122 to storage resource 104 of an early power-off warning signal and/or a bidirectional communication channel between CPLD 122 and storage resource 104. In addition, when implemented as a bidirectional communications channel, such signal channel may also be used for communication of power loss protection capabilities from storage resource 104 and CPLD 122 and/or communication of one or more status signals from storage resource 104 and CPLD in response to an early power-off warning signal.

In addition, although for ease of exposition, only a single storage resource 104 is depicted in FIG. 1, in embodiments in which information handling system 102 includes more than one storage resource 104, such a signal channel may exist from CPLD 122 to each individual storage resource 104, such that each storage resource 104 may receive an individual early power-off warning signal and/or have an individual bidirectional communication channel with CPLD 122. As a result, per drive power loss protection functionality which is typically housed within a storage resource 104 using traditional approaches (e.g., local logic to detect decreases in voltage and large hold-up capacitances) may be moved from the individual storage resources 104 utilizing the throttling signal channel not for intended throttling but as an early power-off warning signal and/or a bidirectional communication channel.

Accordingly, firmware 116 of storage resource 104 may be configured to receive a signal via such throttling signal channel and interpret is as an early power-off warning and thus take actions needed to complete necessary operations (e.g., cache flushing). In addition or alternatively, firmware 116 may be able to transmit (e.g., on an out-of-band interface) information to management controller 106 and/or CPLD 122 such as, for example, the storage resource's required time to complete power loss protection operations and/or a signal indicating completion of power loss protection operations.

FIG. 2 illustrates a flow chart of an example method 200 for power loss protection of storage resources, in accordance with embodiments of the present disclosure. According to certain embodiments, method 200 may begin at step 202. As noted above, teachings of the present disclosure may be implemented in a variety of configurations of information handling system 102 as shown in FIG. 1. As such, the preferred initialization point for method 200 and the order of the steps comprising method 200 may depend on the implementation chosen.

At step 202, management controller 106 may read via an out-of-band communication channel (e.g., field-replaceable unit read, Management Control Protocol over System Management Bus, PCIe Vendor Defined Message, Network Controller Sideband Interface, etc.) from each storage resource 104 of an information handling system 102, information regarding the power loss protection capabilities of the storage resources 104.

At step 204, management controller 106 may determine which storage resources 104 are capable of performing power-loss protection. For example, management controller 106 may determine if the required time needed to complete power loss protection on each of storage resources 104 is supported by the capabilities of information handling system 102.

At step 206, management controller 106 may communicate an instruction to CPLD 122 to re-task an individual throttle control channel (e.g., PWRBRAKE) between CPLD 122 and each power loss protection capable storage resource 104 for communicating an early power-off warning signal to such storage resource 104. In some embodiments, such re-tasking may include re-tasking the individual throttle control channels to bidirectional communications paths.

At step 208, in response to a power fault of PSU 110 (e.g., as indicated by de-assertion of signal AC_OK), CPLD 122 may assert an early power-off warning signal to each power loss protection enabled storage resource 104. For example, in a PCIe solid state drive, the assertion may be converted into individual Inter-Integrated Circuit (I2C) transactions communicated to each storage resource 104.

At step 210, in response to receipt of the early power-off warning signal, a storage resource 104 may initiate power loss protection operations (e.g., orderly shutdown, orderly emergency halt) on storage resource 104. For example, in a Boot Optimized Storage Subsystem (BOSS), a microcontroller unit of the BOSS may assert a signal to a SATA device of the storage resource 104, to which the SATA device may respond by flushing cached data and executing a graceful shutdown. To illustrate, storage resource 104 may employ techniques to speed throughput, assuming that the common case is that they remain powered. If an ungraceful shutdown occurs, they must re-evaluate tables (e.g. Flash Translation Layer tables) on a subsequent power-on. On large storage resources this can take many minutes and the storage resource will appear broken. Graceful shutdown avoids this, and is thus is one of the key reasons graceful shutdown may be desirable.

At step 212, after completion of the power loss protection operation, storage resource 104 may communicate a signal over the throttle control channel to CPLD 122 to indicate that the power loss protection operation has completed. After completion of step 212, method 200 may end.

Although FIG. 2 discloses a particular number of steps to be taken with respect to method 200, it may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof, or any other suitable system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for power loss protection of one or more storage resources, comprising:
   receiving information from each of the one or more storage resources regarding power loss protection capabilities of such storage resource;
   based on the information, repurposing, for each power loss protection capable storage resource, a communications channel between a logic device and such power loss protection capable storage resource for transmission of a respective early power-off warning signal for such power loss protection capable storage resource; and
   in response to a power event of a power supply unit for providing electrical energy to the one or more storage resources, asserting for each power loss protection capable storage resource its respective early power-off warning signal.

2. The method of claim 1, wherein the respective early power-off warning signal for each power loss protection capable storage resource causes such power loss protection capable storage resource to perform power loss protection operations.

3. The method of claim 2, wherein the power loss protection operations comprise at least one of flushing cached data and executing a graceful shutdown of such storage resource.

4. The method of claim 2, further comprising receiving a signal from each communication channel indicating that the power loss protection capable storage resource associated with such communication channel has completed power loss protection operations.

5. An information handling system comprising:
   one or more storage resources;
   a power supply unit for supplying electrical energy to the one or more storage resources; and
   circuitry coupled to the power supply unit and the one or more storage resources and configured to:
      receive information from each of the one or more storage resources regarding power loss protection capabilities of such storage resource;
      based on the information, repurpose, for each power loss protection capable storage resource, a communications channel between a logic device and such power loss protection capable storage resource for transmission of a respective early power-off warning signal for such power loss protection capable storage resource; and
      in response to a power event of the power supply unit for providing electrical energy to the one or more storage resources, assert for each power loss protection capable storage resource its respective early power-off warning signal.

6. The information handling system of claim 5, wherein the respective early power-off warning signal for each power loss protection capable storage resource is configured to cause such power loss protection capable storage resource to perform power loss protection operations.

7. The information handling system of claim 6, wherein the power loss protection operations comprise at least one of flushing cached data and executing a graceful shutdown of such storage resource.

8. The information handling system of claim 6, wherein the circuitry is further configured to receive a signal from each communication channel indicating that the power loss protection capable storage resource associated with such communication channel has completed power loss protection operations.

9. An article of manufacture comprising:
a non-transitory computer readable medium; and
computer-executable instructions carried on the computer readable medium, the instructions readable by a processor, the instructions, when read and executed, for causing the processor to:
receive information from each of one or more or more storage resources regarding power loss protection capabilities of such storage resource;
based on the information, repurpose, for each power loss protection capable storage resource, a communications channel between a logic device and such power loss protection capable storage resource for transmission of a respective early power-off warning signal for such power loss protection capable storage resource; and
in response to a power event of a power supply unit for providing electrical energy to the one or more storage resources, assert for each power loss protection capable storage resource its respective early power-off warning signal.

10. The article of claim 9, wherein the respective early power-off warning signal for each power loss protection capable storage resource is configured to cause such power loss protection capable storage resource to perform power loss protection operations.

11. The article of claim 10, wherein the power loss protection operations comprise at least one of flushing cached data and executing a graceful shutdown of such storage resource.

12. The article of claim 10, the instructions for further causing the processor to receive a signal from each communication channel indicating that the power loss protection capable storage resource associated with such communication channel has completed power loss protection operations.

* * * * *

UNITED STATES PATENT AND TRADEMARK OFFICE
CERTIFICATE OF CORRECTION

PATENT NO. : 10,031,571 B2
APPLICATION NO. : 15/203481
DATED : July 24, 2018
INVENTOR(S) : Stumpf et al.

Page 1 of 1

It is certified that error appears in the above-identified patent and that said Letters Patent is hereby corrected as shown below:

In the Claims

Please amend Claim 9 as follows:
9. An article of manufacture comprising:
    a non-transitory computer readable medium; and
    computer-executable instructions carried on the computer readable medium, the instructions readable by a processor, the instructions, when read and executed, for causing the processor to:
        receive information from each of one or more storage resources regarding power loss protection capabilities of such storage resource;
        based on the information, repurpose, for each power loss protection capable storage resource, a communications channel between a logic device and such power loss protection capable storage resource for transmission of a respective early power-off warning signal for such power loss protection capable storage resource; and
        in response to a power event of a power supply unit for providing electrical energy to the one or more storage resources, assert for each power loss protection capable storage resource its respective early power-off warning signal.

Signed and Sealed this
Eleventh Day of September, 2018

Andrei Iancu
*Director of the United States Patent and Trademark Office*